(12) United States Patent
Li et al.

(10) Patent No.: US 10,545,384 B2
(45) Date of Patent: Jan. 28, 2020

(54) DISPLAY PANEL HAVING CONDUCTIVE LAYER IN PERIPHERAL AREA AND BARRIERS FOR PREVENTING AIR BUBBLE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yang Li, Beijing (CN); Hua Liu, Beijing (CN); Bin Feng, Beijing (CN); Peng Sun, Beijing (CN); Huzhao Shi, Beijing (CN)

(73) Assignees: BOE TECHNOLOGY GROUP CO., LTD., Beijing (CN); BEIJING BOE TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 15/534,156

(22) PCT Filed: Dec. 12, 2016

(86) PCT No.: PCT/CN2016/109484
§ 371 (c)(1),
(2) Date: Jun. 8, 2017

(87) PCT Pub. No.: WO2017/215209
PCT Pub. Date: Dec. 21, 2017

(65) Prior Publication Data
US 2018/0196296 A1    Jul. 12, 2018

(30) Foreign Application Priority Data
Jun. 13, 2016 (CN) .......................... 2016 1 0411071

(51) Int. Cl.
*G02F 1/1362* (2006.01)
*G02F 1/1339* (2006.01)

(52) U.S. Cl.
CPC .... *G02F 1/13394* (2013.01); *G02F 1/136286* (2013.01); *G02F 2001/13396* (2013.01)

(58) Field of Classification Search
CPC ........... G02F 1/13394; G02F 1/136286; G02F 1/1339; G02F 2001/13396; G02F 1/1335
See application file for complete search history.

(56) References Cited

U.S. PATENT DOCUMENTS 8,305,543 B2 * 11/2012 Huang .................. G02F 1/1339
349/153
2006/0119780 A1 * 6/2006 Baek ..................... G02F 1/1339
349/153

(Continued)

FOREIGN PATENT DOCUMENTS

| CN | 1782787 A | 6/2006 |
| CN | 101290417 A | 10/2008 |

(Continued)

OTHER PUBLICATIONS

International Search Report & Written Opinion dated Mar. 22, 2017, regarding PCT/CN2016/109484.

(Continued)

*Primary Examiner* — Huyen L Ngo
(74) *Attorney, Agent, or Firm* — Intellectual Valley Law, P.C.

(57) ABSTRACT

A display panel is provided. The display panel includes a conductive layer having a plurality of protrusions alternating with a plurality of indentations along a side proximal to the interface between the display area and the peripheral area. The plurality of protrusions protrudes in a direction from the peripheral area to the display area. The plurality of indentations indented in a direction from the display area to the peripheral area. Adjacent protrusions spaced apart by an indentation. The display panel further includes a plurality of common electrode signal lines. Each of the plurality of (Continued)

common electrode signal lines extends from an apex of each of the plurality of protrusions into the display area for providing a common voltage. A plurality of openings in the first barrier and the second barrier are substantially aligned with the plurality of indentations.

12 Claims, 5 Drawing Sheets

(56) References Cited

U.S. PATENT DOCUMENTS

| | | | | |
|---|---|---|---|---|
| 2011/0013125 | A1* | 1/2011 | Lee | G02F 1/133711 349/106 |
| 2015/0015934 | A1* | 1/2015 | Yamada | G02F 1/167 359/296 |
| 2015/0268504 | A1 | 9/2015 | Kobayashi et al. | |
| 2016/0147104 | A1* | 5/2016 | Chou | G02F 1/1339 349/153 |
| 2016/0252762 | A1 | 9/2016 | Huang et al. | |
| 2017/0075163 | A1* | 3/2017 | Galstian | G02F 1/133377 |

FOREIGN PATENT DOCUMENTS

| | | |
|---|---|---|
| CN | 101364013 A | 2/2009 |
| CN | 101923255 A | 10/2010 |
| CN | 104133327 A | 11/2014 |

OTHER PUBLICATIONS

First Office Action in the Chinese Patent Application No. 201610411071.X, dated Apr. 17, 2017; English translation attached.

Second Office Action in the Chinese Patent Application No. 201610411071.X, dated Sep. 21, 2017; English translation attached.

* cited by examiner

DISPLAY PANEL HAVING CONDUCTIVE LAYER IN PERIPHERAL AREA AND BARRIERS FOR PREVENTING AIR BUBBLE

CROSS-REFERENCE TO RELATED APPLICATION

This application is a national stage application under 35 U.S.C. § 371 of International Application No. PCT/CN2016/109484 filed Dec. 12, 2016, which claims priority to Chinese Patent Application No. 201610411071.X, filed Jun. 13, 2016, the contents of which are incorporated by reference in the entirety.

TECHNICAL FIELD

The present invention relates to display technology, more particularly, to a display substrate, a display panel and a display apparatus having the same.

BACKGROUND

A liquid crystal display panel has an array substrate and a color filter substrate assembled together in a cell, and a liquid crystal layer sandwiched between the array substrate and the color filter substrate. A process of fabricating a liquid crystal display panel typically includes forming a counter substrate, forming an array substrate, and packaging the counter substrate and the array substrate into a cell. In forming the liquid crystal cell, a sealant is applied to the peripheral area of the array substrate, and liquid crystal molecules are provided onto the display area of the counter substrate, and sealing the array substrate onto the counter substrate.

SUMMARY

In one aspect, the present invention provides a display substrate having a display area and a peripheral area, comprising a base substrate; and a barrier layer on the base substrate in the peripheral area comprising a barrier having a first side proximal to an interface between the display area and the peripheral area and a second side distal to the interface between the display area and the peripheral area; the first side having a first undulating shape; the second side having a second undulating shape; wherein the barrier comprises a plurality of barrier segments, two adjacent barrier segments are spaced apart from each other forming an opening between the two adjacent barrier segments of the barrier; at least one of the plurality of barrier segments having a bend protruding towards the interface between the display area and the peripheral area, thereby forming a convex surface on the first side and a concave surface on the second side.

Optionally, each of the plurality of barrier segments comprises the bend protruding towards the interface between the display area and the peripheral area, thereby forming the convex surface on the first side and the concave surface on the second side in each of the plurality of barrier segments.

Optionally, the at least one of the plurality of barrier segments has a linear shaped cross-section along a plane parallel to the base substrate.

Optionally, the at least one of the plurality of barrier segments comprises a first portion and a second portion joined at an angle thereby forming the bend; the cross-sections of the first portion and the second portion along the plane parallel to the base substrate are joined at the angle.

Optionally, the barrier layer comprises a plurality of barriers; each of the plurality of barriers has a first side proximal to the interface between the display area and the peripheral area and a second side distal to the interface between the display area and the peripheral area; the first side having a first undulating shape; the second side having a second undulating shape; each of the plurality of barriers comprises a plurality of barrier segments arranged substantially in a direction parallel to the interface between the display area and the peripheral area, two adjacent barrier segments of each of the plurality of barriers being spaced apart from each other forming an opening between the two adjacent barrier segments of each of the plurality of barriers; and each of the plurality of barrier segments of each of the plurality of barriers comprises a bend protruding towards the interface between the display area and the peripheral area, thereby forming a convex surface on the first side and a concave surface on the second side in each of the plurality of barrier segments of each of the plurality of barriers.

Optionally, a plurality of openings in one of the plurality of barriers are substantially aligned with those in an adjacent barrier.

Optionally, a plurality of openings in one of the plurality of barriers are offset from those in an adjacent barrier.

Optionally, each of the plurality of barriers has a first terminal distal to the base substrate and a second terminal proximal to the base substrate, heights of a plurality of first terminals of the plurality of barriers relative to the base substrate gradually increase in a direction from the display area to the peripheral area.

Optionally, each of the plurality of barriers has a first terminal distal to the base substrate and a second terminal proximal to the base substrate, heights of a plurality of first terminals of the plurality of barriers relative to the base substrate gradually decrease in a direction from the display area to the peripheral area.

Optionally, the display substrate is an array substrate comprising a conductive layer in the peripheral area; the plurality of barriers comprises a first barrier and a second barrier on the conductive layer; a projection of the first barrier on the base substrate being outside that of the conductive layer, a projection of the second barrier on the base substrate overlapping with that of the conductive layer.

Optionally, the conductive layer is provided with a common voltage.

Optionally, each of the first barrier and the second barrier has a first terminal distal to the base substrate and a second terminal proximal to the base substrate; a height of the first terminal of the second barrier relative to the base substrate is greater than that of the first terminal of the first barrier.

In another aspect, the present invention provides a display substrate having a display area and a peripheral area, comprising a base substrate; a conductive layer in the peripheral area on the base substrate; a first barrier and a second barrier on the base substrate for preventing an air bubble from entering the display area; wherein a projection of the first barrier on the base substrate is outside that of the conductive layer; and a projection of the second barrier on the base substrate overlaps with that of the conductive layer.

In another aspect, the present invention provides a display panel comprising a display substrate described herein.

In another aspect, the present invention provides a display panel comprising a display substrate described herein, wherein the display substrate is a counter substrate; the display panel further comprises an array substrate facing the counter substrate, the array substrate comprising a conductive layer on a base substrate of the array substrate in the peripheral area; wherein the plurality of barriers comprises a first barrier and a second barrier, a projection of the first barrier on the base substrate of the array substrate being outside that of the conductive layer; a projection of the second barrier on a base substrate of the array substrate overlapping with that of the conductive layer.

Optionally, the conductive layer is provided with a common voltage.

Optionally, each of the first barrier and the second barrier has a first terminal distal to the base substrate of the counter substrate and a second terminal proximal to the base substrate of the counter substrate; and a normal distance between the first terminal of the first barrier and a surface of the array substrate is smaller than that between the first terminal of the second barrier and the surface of the array substrate.

Optionally, the conductive layer has a plurality of protrusions alternating with a plurality of indentations along a side proximal to the interface between the display area and the peripheral area, the plurality of protrusions protruding in a direction from the peripheral area to the display area, the plurality of indentations indented in a direction from the display area to the peripheral area; adjacent protrusions spaced apart by an indentation; the array substrate further comprises a plurality of common electrode signal lines; each of the plurality of common electrode signal lines extending from an apex of each of the plurality of protrusions into the display area for providing a common voltage; and a plurality of openings in the first barrier and the second barrier are substantially aligned with the plurality of indentations.

Optionally, the array substrate comprises a gate insulating layer, a gate line layer having a plurality of gate lines on the gate insulating layer, an interlayer dielectric layer on a side of the gate line layer distal to the gate insulating layer, and the conductive layer on a side of the interlayer dielectric layer distal to the gate line layer, wherein a portion of the conductive layer on a side of each of the plurality of gate lines is elevated relative to a surface of a remaining portion of the conductive layer thereby forming a plurality of grooves on a surface of the conductive layer, each of the plurality of grooves sandwiched between two adjacent portions of the conductive layer that are elevated.

Optionally, a plurality of portions of the conductive layer that are elevated are substantially aligned with the plurality of protrusions; and the plurality of grooves are substantially aligned with the plurality of indentations.

In another aspect, the present invention provides a display apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a process of preparing a liquid crystal cell, distribution of liquid crystal molecules in the cell is crucial to display qualities of a liquid crystal display panel. If the liquid crystal molecules diffusion rate is too high, they will be in contact with the sealant for sealing the liquid crystal cell before the sealant is solidified. The liquid crystal molecules will be contaminated by the sealant, affecting rotation of the liquid crystal molecules, and resulting in display defects. On the other hand, if the liquid crystal molecules diffusion rate is too low, bubbles are prone to form in the peripheral area of the liquid crystal cell because it is not filled with the liquid crystal molecules. The bubbles are hidden in the peripheral area, and are hard to detect during a normal quality control process. In subsequent fabricating processes, the display module is pressed, moving the bubbles in the peripheral area to the display area, resulting in display defects.

Accordingly, the present invention provides, inter alia, a display substrate, a display panel and a display apparatus having the same that substantially obviate one or more of the problems due to limitations and disadvantages of the related art. In one aspect, the present disclosure provides a display substrate having a display area and a peripheral area. In some embodiments, the display substrate includes a base substrate; and a barrier layer on the base substrate in the peripheral area including a barrier having a first side proximal to an interface between the display area and the peripheral area and a second side distal to the interface between the display area and the peripheral area; the first side having a first undulating shape; the second side having a second undulating shape. The barrier includes a plurality of barrier segments, two adjacent barrier segments are spaced apart from each other forming an opening between the two adjacent barrier segments of the barrier. At least one of the plurality of barrier segments having a bend protruding towards the interface between the display area and the peripheral area, thereby forming a convex surface on the first side and a concave surface on the second side.

As used herein, the term "display area" refers to an area of the display substrate and display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. As used herein the term "peripheral area" refers to an area where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

As used herein, the term "undulating" refers to wave-like patterns having peaks and valleys. The undulating pattern may be a sinusoidal wave pattern, e.g., having a smooth appearance. Optionally, the undulating pattern is a non-sinusoidal wave pattern, e.g., having a jagged appearance. Examples of undulating patterns include, but are not limited to, a sinusoidal wave pattern, a zig-zag pattern, a square-wave pattern, and a sawtooth wave pattern.

By having a barrier layer in the peripheral area having a plurality of barrier segments spaced apart from each other by a plurality of openings between adjacent barrier segments, fast diffusion of liquid crystal molecules can be avoided. The barrier layer slows down the diffusion of the liquid crystal molecules, preventing direct contact between the liquid crystal molecules and the sealant before the sealant is completely solidified. The contamination of the liquid crystal molecules by the liquid sealant can be avoided. Moreover, the barrier layer prevents bubbles in the peripheral area from traveling back into the display area, preserving display qualities of the display panel.

Figure 1:
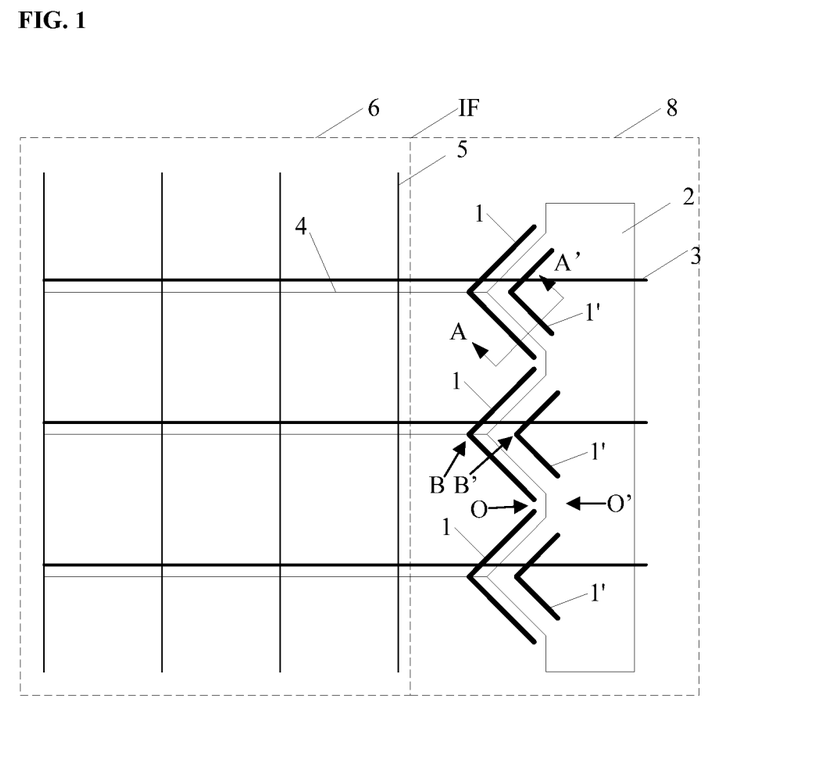
FIG. 1 is a top view of a display panel in some embodiments according to the present disclosure.

FIG. 1 is a top view of a display panel in some embodiments according to the present disclosure. Referring to FIG. 1, the display panel has a display area 6 and a peripheral area 8. The display panel includes a barrier layer having a first barrier having a plurality of barrier segments 1 and a second barrier having a plurality of barrier segments 1' on a base substrate in the peripheral area 8. Each of the first barrier and the second barrier has a first side and a second side opposite to the first side. The first side is proximal to (e.g., facing towards) an interface IF between the display area 6 and the peripheral area 8, and the second side is distal to (e.g., facing away) the interface IF between the display area 6 and the peripheral area 8. As shown in FIG. 1, the first side and the second side both have an undulating shape.

The barrier layer is disposed on a display substrate of the display panel. Optionally, the display substrate is an array substrate. Optionally, the display substrate is a counter substrate. The array substrate and the counter substrate are assembled and sealed together thereby forming the display panel. The barrier layer is in contact with only one of two display substrates (e.g., a counter substrate and an array substrate) of the display panel. In one example, the barrier layer is in contact with the array substrate but spaced apart from the counter substrate. In another example, the barrier layer is in contact with the counter substrate but spaced apart from the array substrate. Optionally, the barrier layer is made in a same process and using a same material as a post spacer layer of the display panel.

Referring to FIG. 1, adjacent barrier segments 1 in the first barrier are spaced apart from each other, forming an opening O between adjacent barrier segments 1 of the first barrier; adjacent barrier segments 1' in the second barrier are spaced apart from each other, forming an opening O' between adjacent barrier segments 1' of the second barrier. Each barrier segment 1 has a bend B protruding towards the interface IF between the display area 6 and the peripheral area 8, forming a convex surface on the first side and a concave surface on the second side. Each of the barrier segments 1 of the first barrier has a linear shaped cross-section along a plane parallel to the base substrate (not explicitly shown in FIG. 1). Each barrier segment 1 includes a first portion and a second portion joined at an included angle, thereby forming the bend B. The cross-sections of the first portion and the second portion along the plane parallel to the base substrate joined at the included angle. Each of the barrier segments 1' of the second barrier has a linear shaped cross-section along a plane parallel to the base substrate. Each barrier segment 1' includes a first portion and a second portion joined at an included angle, thereby forming the bend B'. The cross-sections of the first portion and the second portion along the plane parallel to the base substrate joined at the included angle. In FIG. 1, the linear shaped cross-section is a curved line having two straight lines joined together. In the present display substrate, the barrier segment has a convex surface on the first side and a concave surface on the second side. By having this design, bubbles in the display area can be easily guided into the peripheral area, but not the other way around. The unique structure of the barrier layer effectively prevents bubbles travel from the peripheral area back to the display area.

Optionally, the barrier segment has a width between the first side and the second side in a range of approximately 8 μm to approximately 50 μm. Optionally, the barrier segment has a length that is approximately 8/10 of a length of a subpixel. Optionally, the opening has a width that is approximately 2/10 of a length of a subpixel. Optionally, a ration of the length of the barrier segment to the width of the opening is approximately 8:2.

The included angle between the first portion and the second portion is an angle less than 180 degrees. Optionally, the included angle is an acute angle. Optionally, the included angle is a right angle. Optionally, the included angle is an obtuse angle. By having this design, bubbles in the display area can be easily guided into the peripheral area, but not the other way around. The unique structure of the barrier layer effectively prevents bubbles travel from the peripheral area back to the display area.

Figure 2A:
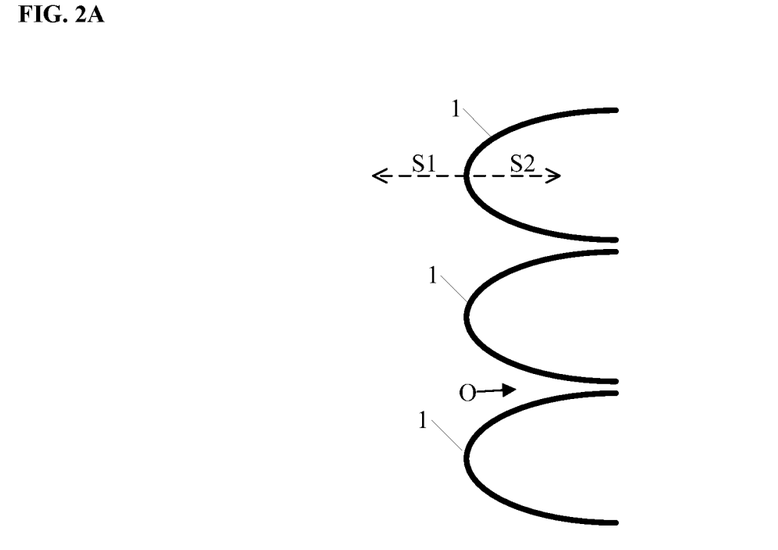
FIG. 2A-2C are diagrams illustrating the structures of some barriers in some embodiments according to the present disclosure.
Figure 2B:
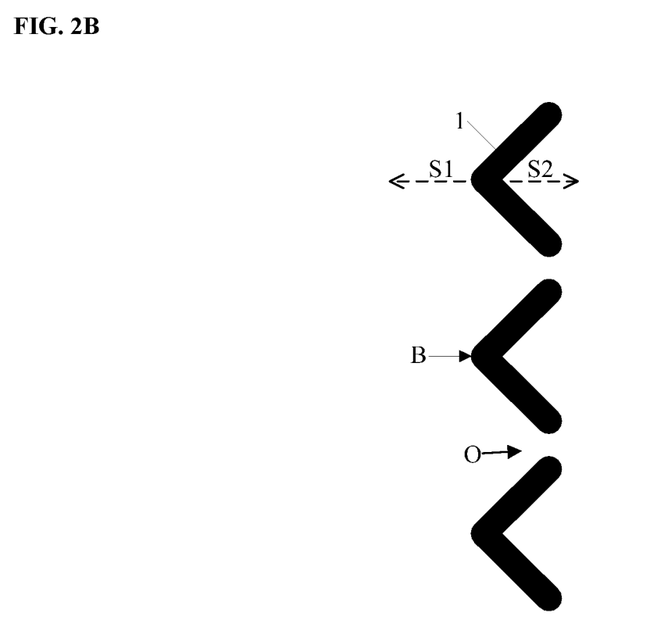
Figure 2C:
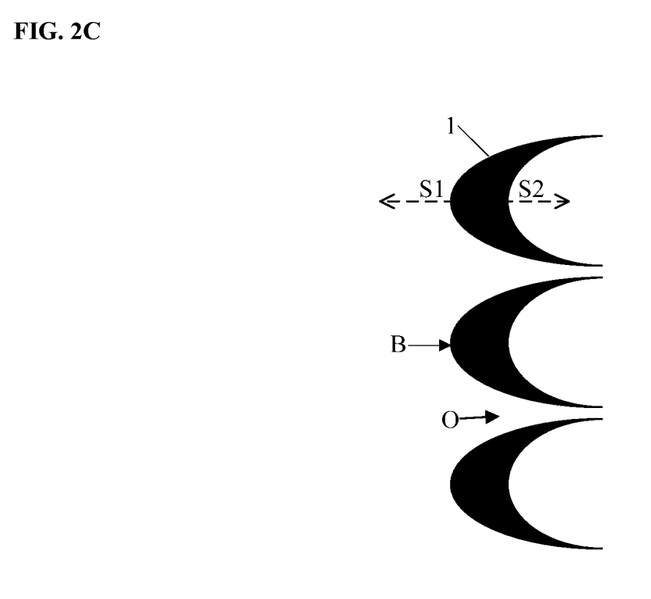

The barrier segments may have various appropriate shapes. FIG. 2A-2C are diagrams illustrating the structures of some barriers in some embodiments according to the present disclosure. Referring to FIG. 2A, each of the barrier segments 1 of the barrier has a linear shaped cross-section along a plane parallel to the base substrate. The linear shaped cross-section is a smoothly curved line (e.g., a parabolic line). Each barrier segment 1 has a bend B protruding towards the interface between the display area and the peripheral area, forming a convex surface on the first side S1 and a concave surface on the second side S2. Adjacent barrier segments 1 in the barrier are spaced apart from each other, forming an opening O between adjacent barrier segments 1.

Referring to FIG. 2B, each of the barrier segments 1 of the barrier has a linear shaped cross-section along a plane parallel to the base substrate. The linear shaped cross-section is a linear, rod-shaped cross-section. Each barrier segment 1 has a bend B protruding towards the interface between the display area and the peripheral area, forming a convex surface on the first side S1 and a concave surface on the second side S2. Each barrier segment 1 includes a first rod-shaped portion and a second rod-shaped portion joined at an angle, thereby forming the bend B. The cross-sections of the first portion and the second portion along the plane parallel to the base substrate joined at the angle. Adjacent barrier segments 1 in the barrier are spaced apart from each other, forming an opening O between adjacent barrier segments 1.

Referring to FIG. 2C, each of the barrier segments 1 of the barrier has a crescent shaped cross-section along a plane parallel to the base substrate. Each barrier segment 1 has a bend B protruding towards the interface between the display area and the peripheral area, forming a convex surface on the first side S1 and a concave surface on the second side S2. Adjacent barrier segments 1 in the barrier are spaced apart from each other, forming an opening O between adjacent barrier segments 1.

In some embodiments, the barrier layer includes a plurality of barriers, each of the plurality of barriers has a first side proximal to the interface between the display area and the peripheral area and a second side distal to the interface between the display area and the peripheral area; the first side having a first undulating shape; the second side having a second undulating shape. Each of the plurality of barriers includes a plurality of barrier segments arranged substantially in a direction parallel to the interface between the display area and the peripheral area. Two adjacent barrier segments of each of the plurality of barriers are spaced apart from each other forming an opening between the two adjacent barrier segments of each of the plurality of barriers. Each of the plurality of barrier segments of each of the plurality of barriers includes a bend protruding towards the interface between the display area and the peripheral area, forming a convex surface on the first side and a concave surface on the second side in each of the plurality of barrier segments of each of the plurality of barriers.

Optionally, a plurality of openings in one of the plurality of barriers are substantially aligned with those in an adjacent barrier, as shown in FIG. 1. Optionally, a plurality of openings in one of the plurality of barriers are offset from those in an adjacent barrier.

Figure 3A:
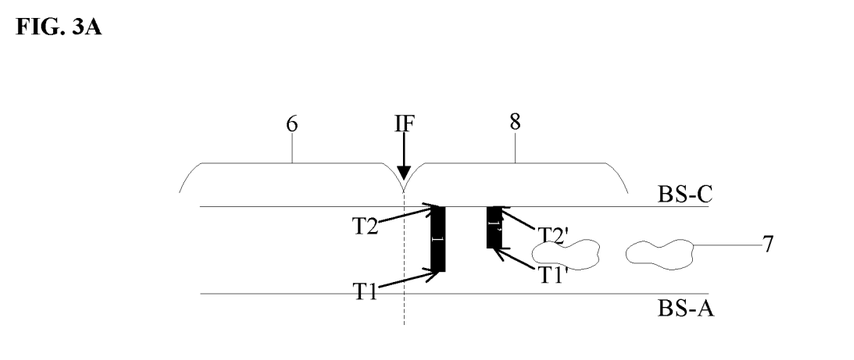
FIG. 3A shows a cross-sectional view along the A-A' direction of the display panel in FIG. 1.

FIG. 3A shows a cross-sectional view along the A-A' direction of the display panel in FIG. 1. Referring to FIG. 3A, the barrier layer in some embodiments is disposed on a counter substrate of the display panel in the peripheral area 8. The barrier layer includes a first barrier having a plurality of barrier segments 1 and a second barrier having a plurality of barrier segments 1'. The first barrier (e.g., the barrier segment 1) has a first terminal T1 distal to the base substrate BS-C of the counter substrate and a second terminal T2 proximal to the base substrate BS-C of the counter substrate. Optionally, heights of a plurality of first terminals (e.g., T1 and T1') of the plurality of barrier segments (e.g., 1 and 1') relative to the base substrate BS-C of the counter substrate gradually decrease in a direction from the display area 6 to the peripheral area 8. As shown in FIG. 3A, this step-wise structure effectively prevents bubble 7 in the peripheral area 8 from returning back to the display area 6.

Figure 3B:
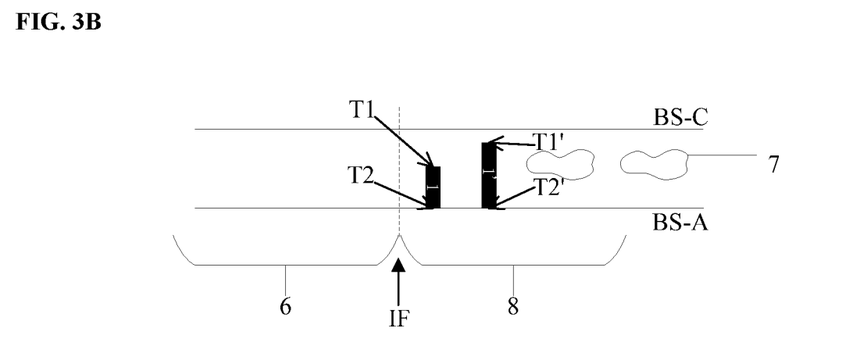
FIG. 3B shows a cross-sectional view along the A-A' direction of the display panel in FIG. 1.

FIG. 3B shows a cross-sectional view along the A-A' direction of the display panel in FIG. 1. Referring to FIG. 3B, the barrier layer in some embodiments is disposed on the array substrate of the display panel in the peripheral area 8. The barrier layer includes a first barrier having a plurality of barrier segments 1 and a second barrier having a plurality of barrier segments 1'. The first barrier (e.g., the barrier segment 1) has a first terminal T1 distal to the base substrate BS-A of the array substrate and a second terminal T2 proximal to the base substrate BS-A of the array substrate. Optionally, heights of a plurality of first terminals (e.g., T1 and T1') of the plurality of barrier segments (e.g., 1 and 1') relative to the base substrate BS-A of the array substrate gradually increase in a direction from the display area 6 to the peripheral area 8. As shown in FIG. 3B, this step-wise structure prevents bubble 7 in the peripheral area 8 from returning back to the display area 6.

Figure 3C:
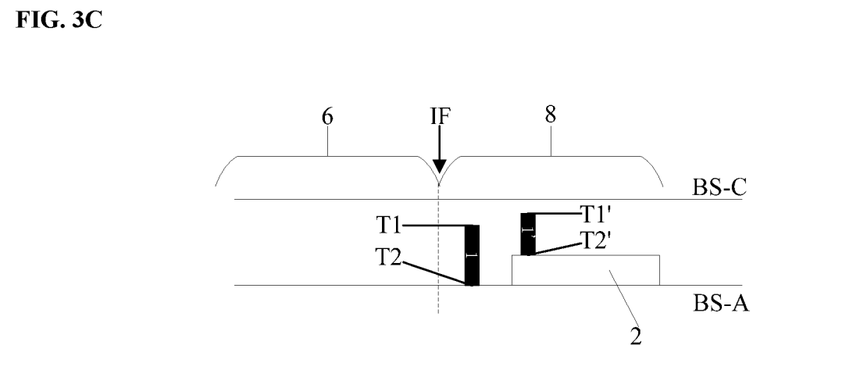
FIG. 3C shows a cross-sectional view along the A-A' direction of the display panel in FIG. 1.

FIG. 3C shows a cross-sectional view along the A-A' direction of the display panel in FIG. 1. Referring to FIG. 3C, the array substrate includes a conductive layer 2 in the peripheral area 8. The barrier layer is disposed on the array substrate of the display panel in the peripheral area 8. The barrier layer includes a first barrier having a plurality of barrier segments 1 and a second barrier having a plurality of barrier segments 1'. The second barrier is on a side of the conductive layer 2 distal to the base substrate BS-A of the array substrate. A projection of the first barrier on the base substrate BS-A of the array substrate is outside that of the conductive layer, and a projection of the second barrier on the base substrate BS-A of the array substrate overlaps with that of the conductive layer 2. As shown in FIG. 3C, the first barrier has a first terminal T1 distal to the base substrate BS-A of the array substrate and a second terminal T2 proximal to the base substrate BS-A of the array substrate, the second barrier has a first terminal T1' distal to the base substrate BS-A of the array substrate and a second terminal T2' proximal to the base substrate BS-A of the array substrate. A height of the first terminal T1' of the second barrier relative to the base substrate BS-A of the array substrate is greater than that of the first terminal T1 of the first barrier. As shown in FIG. 3C, this step-wise structure prevents bubble 7 in the peripheral area 8 from returning back to the display area 6.

Accordingly, in some embodiments, the display substrate of the present disclosure includes a base substrate; a conductive layer in the peripheral area on the base substrate; and a first barrier and a second barrier on the base substrate for preventing an air bubble from entering the display area. A projection of the first barrier on the base substrate is outside that of the conductive layer; and a projection of the second barrier on the base substrate overlaps with that of the conductive layer. Optionally, each of the first barrier and the second barrier has an undulating shape. Optionally, the conductive layer has an undulating edge corresponding to the undulating shapes of the first barrier and the second barrier. Optionally, the undulating shape is a zig-zag shape, and the undulating edge is a zig-zag edge. Optionally, the undulating shape has a sinusoidal wave pattern, and the undulating edge has a sinusoidal wave pattern. Optionally, the undulating shape is a square-wave pattern, and the undulating edge has a square-wave pattern. Optionally, the conductive layer is a common electrode conductive layer provided with a common voltage. Optionally, the first barrier includes a plurality of first barrier segments, two adjacent first barrier segments are spaced apart from each other forming an opening between the two adjacent first barrier segments of the first barrier, each of the plurality of first barrier segments having a bend protruding towards the interface between the display area and the peripheral area, thereby forming a convex surface on the first side and a concave surface on the second side. Optionally, the second barrier includes a plurality of second barrier segments, two adjacent second barrier segments are spaced apart from each other forming an opening between the two adjacent second barrier segments of the second barrier; each of the plurality of second barrier segments has a bend protruding towards the interface between the display area and the peripheral area, thereby forming a convex surface on the first side and a concave surface on the second side. Optionally, the conductive layer has a plurality of protrusions alternating with a plurality of indentations along a side proximal to the interface between the display area and the peripheral area, the plurality of protrusions protruding in a direction from the peripheral area to the display area, the plurality of indentations indented in a direction from the display area to the peripheral area; adjacent protrusions spaced apart by an indentation. Optionally, a plurality of openings in the first barrier and the second barrier are substantially aligned with the plurality of indentations in the conductive layer. Optionally, the plurality of bends in the first barrier and the second barrier are substantially aligned with the plurality of protrusions in the conductive layer.

Figure 3D:
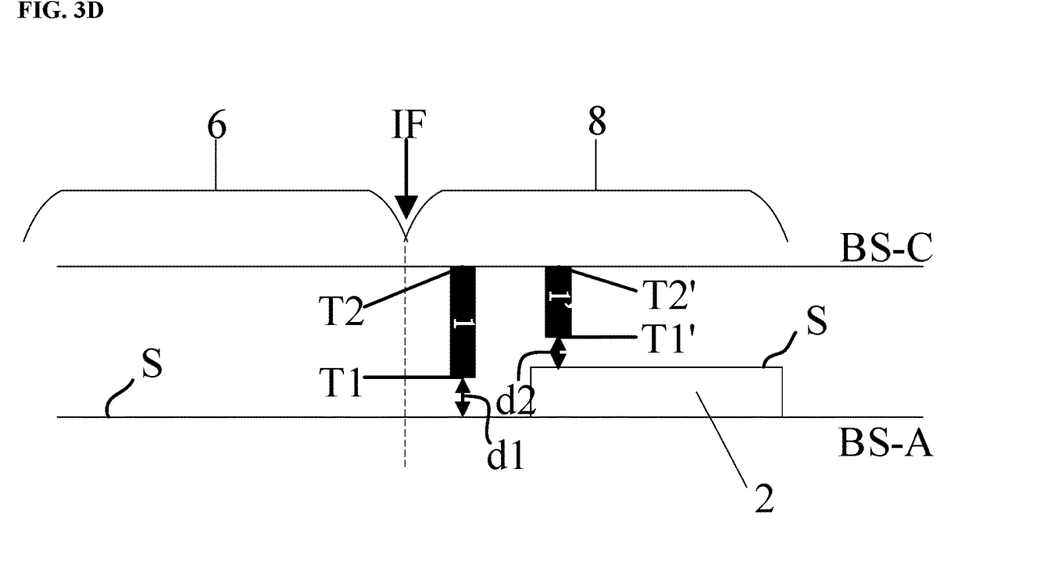
FIG. 3D shows a cross-sectional view along the A-A' direction of the display panel in FIG. 1.

FIG. 3D shows a cross-sectional view along the A-A' direction of the display panel in FIG. 1. Referring to FIG. 3D, the array substrate includes a conductive layer 2 in the peripheral area 8. The barrier layer in FIG. 3D is disposed on the array substrate of the display panel in the peripheral area 8. The barrier layer includes a first barrier having a plurality of barrier segments 1 and a second barrier having a plurality of barrier segments 1'. A projection of the first barrier on the base substrate BS-A of the array substrate is outside that of the conductive layer 2. A projection of the second barrier on a base substrate BS-A of the array substrate overlaps with that of the conductive layer 2. The first barrier (e.g., the barrier segment 1) has a first terminal T1 distal to the base substrate BS-C of the counter substrate and a second terminal T2 proximal to the base substrate BS-C of the counter substrate. A shortest distance d1 between the first terminal T1 of the first barrier and a surface S of the array substrate is greater than a shortest distance d2 between the first terminal T1' of the second barrier and the surface S of the array substrate. Here, the surface of the array substrate may not be a leveled surface, for example, the surface of the array substrate corresponding to the first terminal T1 of the first barrier may be a surface of the base substrate BS-A of the array substrate whereas the surface of the array substrate corresponding to the first terminal T1' of the second barrier may be a surface of the conductive layer 2, as shown in FIG. 3D. As shown in FIG. 3D, this step-wise structure prevents bubble 7 in the peripheral area 8 from returning back to the display area 6.

In some embodiments, the conductive layer may be a common electrode conductive layer. For example, the conductive layer may be provided with a common voltage. In turn, the conductive layer may be connected to a plurality of common electrode signal lines for provides common voltage to the display area. Optionally, the conductive layer may be a conductive layer connected to a plurality of touch signal lines. Optionally, the conductive layer may be a conductive layer connected to a plurality of other signal lines.

Figure 4:
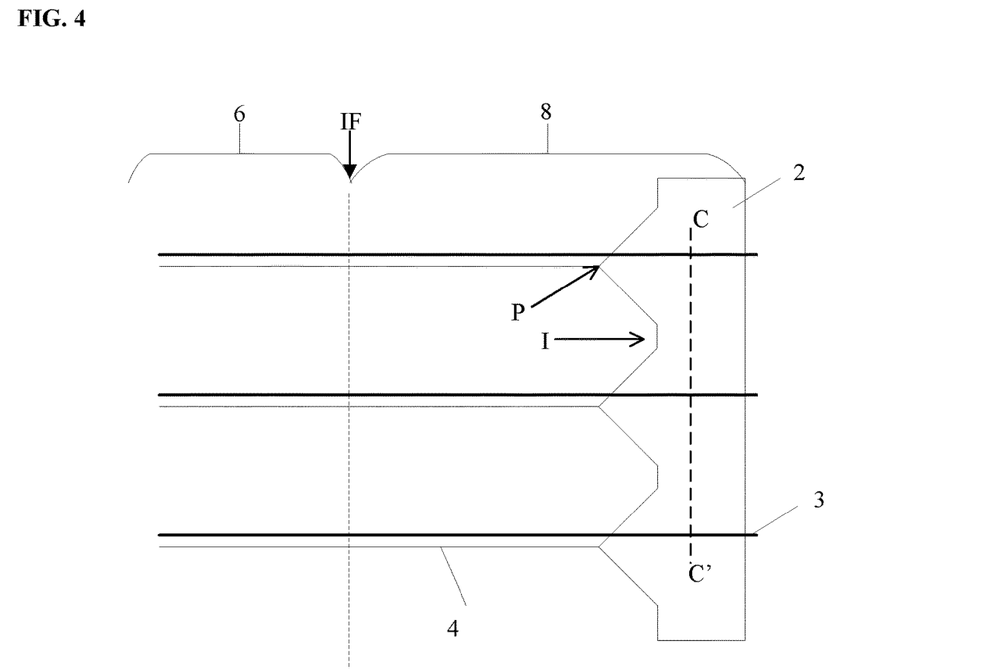
FIG. 4 is a top view of an array substrate in some embodiments according to the present disclosure.

FIG. 4 is a top view of an array substrate in some embodiments according to the present disclosure. Referring to FIG. 4, the conductive layer 2 has a plurality of protrusions P alternating with a plurality of indentations I along a side of the conductive layer 2 proximal to the interface IF between the display area 6 and the peripheral area 8. The plurality of protrusions P protrude in a direction from the peripheral area 8 to the display area 6. The plurality of indentations I indent in a direction from the display area 6 to the peripheral area 8. Two adjacent protrusions P are spaced apart by an indentation I. A plurality of indentations I are spaced apart along a side of the conductive layer 2 proximal to the interface IF, forming a plurality of protrusions P. Each indentation I is positioned between consecutive protrusions P. The array substrate further includes a plurality of common electrode signal lines 4; each of the plurality of common electrode signal lines 4 extending from an apex of each of the plurality of protrusions P into the display area 6 for providing a common voltage. Referring to FIG. 1 and FIG. 4, in some embodiments, a plurality of openings O in the first barrier and a plurality of openings O' in the second barrier are substantially aligned with the plurality of indentations I in the conductive layer 2. This unique structure of the conductive layer 2 facilitates movements of bubbles from the display area 6 into the peripheral area 8 through the openings O and O'.

Figure 5:
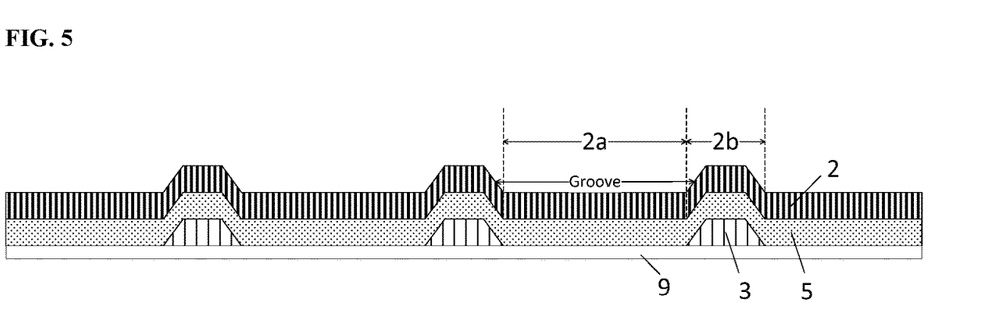
FIG. 5 is a cross-sectional view along the C-C' direction of the array substrate in FIG. 4.

FIG. 5 is a cross-sectional view along the C-C' direction of the array substrate in FIG. 4. Referring to FIG. 5, the array substrate includes a gate line layer having a plurality of gate lines 3 on a gate insulating layer 9, an interlayer dielectric layer 5 on a side of the gate line layer distal to the gate insulating layer 9, and a conductive layer 2 on a side of the interlayer dielectric layer 5 distal to the gate line layer. The gate line 3 is elevated relative to the surface of the gate insulating layer 9. Accordingly, a portion of the interlayer dielectric layer 5 and a portion 2b of the conductive layer 2 on top of the gate line 3 are also elevated. A groove is formed in a region corresponding to a portion 2a of the conductive layer 2 between two adjacent portions 2b. Each groove is sandwiched between two adjacent portions 2b. Optionally, the portion 2b corresponds to the protrusion P of the conductive layer 2 in FIG. 4, and the portion 2a corresponds to the indentation I of the conductive layer 2 in FIG. 4. When a liquid crystal alignment film (e.g., a polyimide film) is applied on the surface of the array substrate, the grooves formed on the surface of the conductive layer 2 facilitate the dissipation of the alignment film solution (e.g., a polyimide solution). Optionally, the array substrate further includes a plurality of common electrode signal lines; each of the plurality of common electrode signal lines extending from an apex of each of the plurality of protrusions P into the display area for providing a common voltage. Optionally, a plurality of openings in the first barrier and a plurality of openings in the second barrier are substantially aligned with the plurality of indentations I in the conductive layer 2.

In another aspect, the present disclosure provides a display panel having a display substrate described herein.

In another aspect, the present disclosure provides a display apparatus having a display panel described herein. Examples of appropriate display apparatuses includes, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a display area and a peripheral area, comprising a counter substrate and an array substrate facing the counter substrate, the array substrate comprising a conductive layer on a first base substrate of the array substrate in the peripheral area;
   wherein the counter substrate comprises:
   a second base substrate; and
   a barrier layer on the second base substrate in the peripheral area comprising a barrier having a first side proximal to an interface between the display area and the peripheral area and a second side distal to the interface between the display area and the peripheral area; the first side having a first undulating shape; the second side having a second undulating shape;
   wherein the barrier comprises a plurality of barrier segments, two adjacent barrier segments are spaced apart from each other forming an opening between the two adjacent barrier segments of the barrier;
   at least one of the plurality of barrier segments having a bend protruding towards the interface between the display area and the peripheral area, thereby forming a convex surface on the first side and a concave surface on the second side;
   wherein the barrier layer comprises a plurality of barriers;
   each of the plurality of barriers has a first side proximal to the interface between the display area and the peripheral area and a second side distal to the interface between the display area and the peripheral area; the first side having a first undulating shape; the second side having a second undulating shape;
   each of the plurality of barriers comprises a plurality of barrier segments arranged substantially in a direction parallel to the interface between the display area and the peripheral area, two adjacent barrier segments of each of the plurality of barriers being spaced apart from each other forming an opening between the two adjacent barrier segments of each of the plurality of barriers; and
   each of the plurality of barrier segments of each of the plurality of barriers comprises a bend protruding towards the interface between the display area and the peripheral area, thereby forming a convex surface on the first side and a concave surface on the second side in each of the plurality of barrier segments of each of the plurality of barriers;
   wherein the plurality of barriers comprises a first barrier and a second barrier;
   a projection of the first barrier on the first base substrate of the array substrate being outside a projection of the conductive layer on the first base substrate; a projection of the second barrier on the first base substrate of the array substrate overlapping with the projection of the conductive layer on the first base substrate;
   wherein the conductive layer has a plurality of protrusions alternating with a plurality of indentations along a side proximal to the interface between the display area and the peripheral area, the plurality of protrusions protruding in a direction from the peripheral area to the display area, the plurality of indentations indented in a direction from the display area to the peripheral area; adjacent protrusions spaced apart by an indentation;
   the array substrate further comprises a plurality of common electrode signal lines; each of the plurality of common electrode signal lines extending from an apex of each of the plurality of protrusions into the display area for providing a common voltage; and
   a plurality of openings in the first barrier and the second barrier are substantially aligned with the plurality of indentations.

2. The display panel of claim 1, wherein the conductive layer is provided with a common voltage.

3. The display panel of claim 1, each of the first barrier and the second barrier has a first terminal and a second terminal;
   the second terminal is on a side of the first terminal closer to the first base substrate of the counter substrate; and
   a shortest distance between the first terminal of the first barrier and a surface of the array substrate is greater than a shortest distance between the first terminal of the second barrier and the surface of the array substrate.

4. The display panel of claim 1, wherein the array substrate comprises a gate insulating layer, a gate line layer having a plurality of gate lines on the gate insulating layer, an interlayer dielectric layer on a side of the gate line layer distal to the gate insulating layer, and the conductive layer on a side of the interlayer dielectric layer distal to the gate line layer;
   wherein a portion of the conductive layer on a side of each of the plurality of gate lines is elevated relative to a surface of a remaining portion of the conductive layer thereby forming a plurality of grooves on a surface of the conductive layer;
   each of the plurality of grooves sandwiched between two adjacent portions of the conductive layer that are elevated.

5. The display panel of claim 4, wherein a plurality of portions of the conductive layer that are elevated are substantially aligned with the plurality of protrusions; and
   the plurality of grooves are substantially aligned with the plurality of indentations.

6. The display panel of claim 1, wherein each of the plurality of barrier segments comprises the bend protruding towards the interface between the display area and the peripheral area, thereby forming the convex surface on the first side and the concave surface on the second side in each of the plurality of barrier segments.

7. The display panel of claim 1, wherein the at least one of the plurality of barrier segments has a linear shaped cross-section along a plane parallel to the first base substrate.

8. The display panel of claim 7, wherein the at least one of the plurality of barrier segments comprises a first portion and a second portion joined at an angle thereby forming the bend;
   cross-sections of the first portion and the second portion along the plane parallel to the first base substrate are joined at the angle.

9. The display panel of claim 1, wherein a plurality of openings respectively between adjacent barrier segments in a respective one of the plurality of barriers are respectively substantially aligned with a plurality of openings respectively between adjacent barrier segments in an adjacent barrier of the plurality of barriers.

10. The display panel of claim 1, wherein a plurality of openings in one of the plurality of barriers are offset from those in an adjacent barrier.

11. The display panel of claim 1, wherein the conductive layer is provided with a common voltage.

12. The display panel of claim 1, each of the first barrier and the second barrier has a first terminal and a second terminal;
   the second terminal is on a side of the first terminal closer to the first base substrate of the counter substrate; and
   a shortest distance between the first terminal of the second barrier and the first base substrate is smaller than a shortest distance between the first terminal of the first barrier and the first base substrate.

\* \* \* \* \*